United States Patent
Ishizaki et al.

(10) Patent No.: US 12,422,353 B2
(45) Date of Patent: Sep. 23, 2025

(54) DEVICES, SYSTEMS, AND METHODS FOR ANALYZING MEASUREMENT OBJECTS

(71) Applicant: Aikemy Gmbh, Zurich (CH)

(72) Inventors: Kotaro Ishizaki, Zurich (CH); Agata Dorota Ishizaki-Sroka, Zurich (CH)

(73) Assignee: Aikemy GmbH, Zurich (CH)

( * ) Notice: Subject to any disclaimer, the term of this patent is extended or adjusted under 35 U.S.C. 154(b) by 197 days.

(21) Appl. No.: 18/071,690

(22) Filed: Nov. 30, 2022

(65) Prior Publication Data

US 2024/0175807 A1    May 30, 2024

Related U.S. Application Data

(60) Provisional application No. 63/291,463, filed on Dec. 20, 2021.

(51) Int. Cl.
*G01N 21/27* (2006.01)
*G01J 3/02* (2006.01)
(Continued)

(52) U.S. Cl.
CPC .......... *G01N 21/274* (2013.01); *G01J 3/0256* (2013.01); *G01J 3/027* (2013.01);
(Continued)

(58) Field of Classification Search
CPC ............ G01N 21/274; G01N 2201/121; G01J 3/0256; G01J 3/027; G01J 3/0294;
(Continued)

(56) References Cited

U.S. PATENT DOCUMENTS 5,691,817 A * 11/1997 Cargill ................. G01N 21/274
356/405
5,963,333 A * 10/1999 Walowit ................ G01J 3/0251
356/334
(Continued)

FOREIGN PATENT DOCUMENTS

WO    WO-2008109183 A1 *  9/2008  .............. G01J 3/021
WO       2020101575 A1    5/2020

OTHER PUBLICATIONS

Lorenz, Sandra, et al. "Multi-sensor spectral imaging of geological samples: A data fusion approach using spatio-spectral feature extraction." Sensors 19.12 (2019): 2787. (Year: 2019).*
(Continued)

*Primary Examiner* — Michelle M Iacoletti
*Assistant Examiner* — Noah J. Haney
(74) *Attorney, Agent, or Firm* — Rivka Friedman

(57) ABSTRACT

A device for analyzing a sample includes a measurement area at which the sample is to be located, an illumination arrangement, and first and second spectral sensors. The illumination arrangement illuminates the measurement area such that the illumination is incident on the sample. Each of the first and second spectral sensors is oriented toward the measurement area to collect illumination arriving from the measurement area. The first spectral sensor performs a spectral measurement of the sample in response to the incident illumination so as to produce spectral measurement data. The second spectral sensor measures background noise so as to produce background measurement data that provides at least a partial correction for noise in the spectral measurement data. In certain embodiments, operation of the first and second spectral sensors is switched such that the second spectral sensor performs a spectral measurement and the first spectral sensor measures background noise.

23 Claims, 6 Drawing Sheets

(51) Int. Cl.
*G01J 3/28* (2006.01)
*G01J 3/36* (2006.01)
*G01J 3/42* (2006.01)

(52) U.S. Cl.
CPC ........... *G01J 3/0294* (2013.01); *G01J 3/0297* (2013.01); *G01J 3/28* (2013.01); *G01J 3/36* (2013.01); *G01J 3/42* (2013.01); *G01J 3/0272* (2013.01); *G01N 2201/121* (2013.01)

(58) Field of Classification Search
CPC .... G01J 3/0297; G01J 3/28; G01J 3/36; G01J 3/42; G01J 3/0272
USPC .................................................. 356/300–343
See application file for complete search history.

(56) References Cited

U.S. PATENT DOCUMENTS

| | | |
|---|---|---|
| 6,512,577 B1 | 1/2003 | Ozanich |
| 11,877,845 B1 * | 1/2024 | Davis .................... G01J 3/0256 |
| 2003/0007154 A1 | 1/2003 | Tandon et al. |
| 2013/0256534 A1 * | 10/2013 | Micheels ........... G01N 21/8507 |
| | | 250/339.07 |
| 2014/0152990 A1 * | 6/2014 | Ehbets .................... G01J 3/504 |
| | | 356/402 |
| 2015/0373285 A1 * | 12/2015 | Morris ...................... G01J 3/42 |
| | | 250/252.1 |
| 2016/0058310 A1 * | 3/2016 | Iijima .................... A61B 5/681 |
| | | 600/476 |
| 2017/0112398 A1 * | 4/2017 | Narusawa ............. A61B 5/681 |
| 2017/0265816 A1 * | 9/2017 | Fung ..................... A61B 5/7203 |
| 2018/0136042 A1 * | 5/2018 | Goldring ................. G01J 3/10 |
| 2018/0231457 A1 * | 8/2018 | Chen .................... G01N 21/274 |
| 2020/0209158 A1 * | 7/2020 | Nikolaenko ........... G01N 21/27 |
| 2021/0176412 A1 * | 6/2021 | Yoon ...................... H04N 23/11 |
| 2021/0396577 A1 * | 12/2021 | Eilertsen ................... G01J 3/36 |
| 2022/0244101 A1 * | 8/2022 | Sabry .................... G01J 3/0256 |
| 2022/0357200 A1 * | 11/2022 | D'Aleo .................. G01J 3/0286 |
| 2023/0240591 A1 * | 8/2023 | De Bock ................ A61B 5/445 |
| | | 600/306 |

OTHER PUBLICATIONS

European Search Report EP 22214129 Mailed on May 31, 2023.

* cited by examiner

DEVICES, SYSTEMS, AND METHODS FOR ANALYZING MEASUREMENT OBJECTS

CROSS-REFERENCE TO RELATED APPLICATIONS

This application claims priority from U.S. Provisional Patent Application No. 63/291,463, filed Dec. 20, 2021, whose disclosure is incorporated by reference in its entirety herein.

TECHNICAL FIELD

The present invention relates to spectral analysis.

BACKGROUND OF THE INVENTION

Spectroscopy techniques are widely used as tools for studying the structures of atoms and molecules. Spectroscopic systems make it possible to investigate the interaction between matter and electromagnetic radiation as a function of the wavelength or frequency of the radiation, and are useful in exploring composition or physical structure at atomic or molecular level. Such systems are of fundamental importance for chemical analysis because of their specificity and quantitative nature. The specificity of spectra allows compounds to be distinguished from one another in a mixture, making spectroscopic systems useful, for instance, to find the constituents in material having unknown chemical composition or to classify measurements objects in wide variety of applications in chemistry, food science, biology, pharmacology, materials/nanotechnology, and water quality analysis in various environmental, geology, hydrology, oceanography/limnology, and soil science applications, etc.

Spectroscopy can also be used to identify and measure or quantify various types of measurement object, including but not limited to solids, powders, suspended and dissolved organic and/or inorganic materials or compounds present within a sample. Spectroscopic methods are desirable for analysis of measurement objects because they often require minimal sample preparation, provide quick analysis, and have the potential to execute multiple tests on a single sample.

However, conventional spectroscopy systems and devices often fail to consider background noise in spectral measurements, which can be due to fluctuations or changes in the environment surrounding or otherwise associated with the sample under analysis.

SUMMARY OF THE INVENTION

The present invention is a device, system, and method for spectrally analyzing measurement objects, also referred to as samples.

According to the teachings of an embodiment of the present invention, there is provided a device for analyzing a sample of material. The device comprises: a measurement area at which the sample is to be located; an illumination arrangement including at least one illumination source for illuminating the measurement area with illumination such that the illumination is incident on the sample; and a spectral sensing arrangement including: a first spectral sensor configured to perform a spectral measurement of the sample in response to the incident illumination so as to produce spectral measurement data, and a second spectral sensor configured to measure background noise so as to produce background measurement data that provides at least a partial correction for noise in the spectral measurement data, and the spectral sensing arrangement deployed such that each of the first and second spectral sensors is oriented toward the measurement area so as to collect illumination arriving from the measurement area.

According to a further feature of an embodiment of the present invention, the device further comprises: a processing unit associated with the spectral sensing arrangement and configured to apply a correction to the spectral measurement data, based on the background measurement data, to produce corrected spectral measurement data.

According to a further feature of an embodiment of the present invention, the device further comprises: a processing unit associated with the spectral sensing arrangement and configured to: switch operation of the spectral sensing arrangement such that: the second spectral sensor performs a second spectral measurement of the sample in response to the incident illumination so as to produce second spectral measurement data, and the first spectral sensor measures background noise so as to produce second background measurement data that provides at least a partial correction for noise in the second spectral measurement data.

According to a further feature of an embodiment of the present invention, the processing unit is further configured to apply a correction to the second spectral measurement, based on the second background measurement, to produce second corrected spectral measurement data.

According to a further feature of an embodiment of the present invention, the first spectral sensor is sensitive to illumination in a first range of wavelengths, and the second spectral sensor is sensitive to illumination in a second range of wavelength.

According to a further feature of an embodiment of the present invention, the first range of wavelengths is non-overlapping with the second range of wavelengths.

According to a further feature of an embodiment of the present invention, the first range of wavelengths is partially overlapping with the second range of wavelengths.

According to a further feature of an embodiment of the present invention, the first spectral sensor has an associated first field of view (FOV) and the second spectral sensor has an associated second FOV, and a measure of the FOV of the first spectral sensor is approximately equal to a measure of the FOV of the second spectral sensor, and the first FOV and second FOV are in overlapping relation with each other, and the first and second spectral sensors are oriented such that the measurement area falls within the first FOV and the second FOV.

According to a further feature of an embodiment of the present invention, the illumination arrangement has an associated illumination field and is oriented such that the measurement area falls within the illumination field and such that the illumination field is in overlapping relation with the first FOV and the second FOV, and each of the first FOV and the second FOV is less than the illumination field.

According to a further feature of an embodiment of the present invention, the first spectral sensor has an associated first field of view (FOV) and the second spectral sensor has an associated second FOV that is approximately equal to the first FOV, and the first and second spectral sensors are symmetrically oriented about an axis that is substantially perpendicular to the measurement area such that the measurement area falls within the first FOV and the second FOV.

According to a further feature of an embodiment of the present invention, the measurement area forms at least part of a cover member of the device.

According to a further feature of an embodiment of the present invention, the measurement area is transmissive to the illumination from the illumination arrangement.

There is also provided according to the teachings of an embodiment of the present invention, a system for analyzing a sample of material. The system comprises: the device provided according to the teachings of embodiments of the present invention; and a processing subsystem associated with the spectral sensing arrangement configured to apply a correction to the spectral measurement data, based on the background measurement data, to produce corrected spectral measurement data.

According to a further feature of an embodiment of the present invention, the processing subsystem is further configured to: switch operation of the spectral sensor subsystem such that: the second spectral sensor performs a second spectral measurement of the sample in response to the incident illumination so as to produce second spectral measurement data, and the first spectral sensor measures background noise so as to produce second background measurement data, and apply a correction to the second spectral measurement based on the second background measurement.

According to a further feature of an embodiment of the present invention, the processing subsystem is further configured to perform an assessment analysis of the sample based on the corrected spectral measurement data and one or more prediction models.

According to a further feature of an embodiment of the present invention, the processing subsystem includes at least one processing component that is deployed as part of a storage and processing system that is separate from the device.

There is also provided according to the teachings of an embodiment of the present invention, a method for analyzing a sample of material. The method comprises: deploying a first spectral sensor and a second spectral sensor such that each of the first and second spectral sensors is oriented toward a measurement area at which the sample is located so as to collect illumination arriving from the measurement area; illuminating the measurement area with illumination such that the illumination is incident on the sample; by the first spectral sensor, performing a spectral measurement of the sample in response to the incident illumination so as to produce spectral measurement data; and by the second spectral sensor, measuring background noise so as to produce background measurement data that provides at least a partial correction for noise in the spectral measurement data.

According to a further feature of an embodiment of the present invention, the method further comprises: applying a correction to the spectral measurement data, based on the background measurement data, to produce corrected spectral measurement data.

According to a further feature of an embodiment of the present invention, the method further comprises: by the second spectral sensor, performing a second spectral measurement of the sample in response to the incident illumination so as to produce second spectral measurement data; and by the first spectral sensor, measuring background noise so as to produce second background measurement data that provides at least a partial correction for noise in the second spectral measurement data.

According to a further feature of an embodiment of the present invention, the method further comprises: applying a correction to the second spectral measurement data, based on the second background measurement data, to produce second corrected spectral measurement data.

According to a further feature of an embodiment of the present invention, performing the spectral measurement by the first spectral sensor includes measuring reflectance over a range of wavelength.

According to a further feature of an embodiment of the present invention, the method further comprises: performing an assessment analysis of the sample based on the corrected spectral measurement data and one or more prediction models.

There is also provided according to the teachings of an embodiment of the present invention, a device for analyzing a sample of material. The device comprises: a measurement area at which the sample is to be located; an illumination arrangement including at least one illumination source for illuminating the measurement area with illumination such that the illumination is incident on the sample; and a spectral sensing arrangement including: a first spectral sensor configured to perform a spectral measurement of the sample in response to the incident illumination so as to produce spectral measurement data, and a second spectral sensor configured to perform a spectral measurement of the sample in response to the incident illumination so as to produce spectral measurement data, and the spectral sensing arrangement deployed such that each of the first and second spectral sensors is oriented toward the measurement area so as to collect illumination arriving from the measurement area.

There is also provided according to the teachings of an embodiment of the present invention, a method for fabricating a spectrometer device. The method comprises: obtaining a body member having a bottom wall and at least one sidewall extending outwardly from the bottom wall and continuously along an entire periphery of the bottom wall, the bottom wall and the at least one sidewall defining a cavity; deploying an illumination arrangement having at least one light source within the cavity; deploying a spectral sensing arrangement having at least a first spectral sensor and a second spectral sensor within the cavity; and attaching a cover member to the body member at the at least one sidewall so as to encase the illumination arrangement and the spectral sensing arrangement within the body member, and the cover member includes a light-transmitting measurement area at which a sample is to be located, and the deploying the illumination arrangement includes positioning the illumination arrangement such that illumination from the illumination arrangement is incident on the measurement area, and the deploying the spectral sensing arrangement includes positioning the first and second spectral sensors such that each of the first and second spectral sensors is oriented toward the measurement area so as to collect illumination arriving from the measurement area.

According to a further feature of an embodiment of the present invention, the deploying the illumination arrangement includes mounting the illumination arrangement to a printed circuit board (PCB), and the deploying the spectral sensing arrangement includes mounting the first and spectral sensors to the PCB, and the PCB is mounted within the cavity.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DESCRIPTION OF THE PREFERRED EMBODIMENTS

The present invention is a device, system, and method for spectrally analyzing measurement objects.

The principles and operation of the device, system, and method according to the present invention may be better understood with reference to the drawings and the accompanying description.

The present invention is applicable to various forms of spectroscopy and spectrometry for obtaining and analyzing the spectral characteristics associated with a measurement object.

Figure 1:
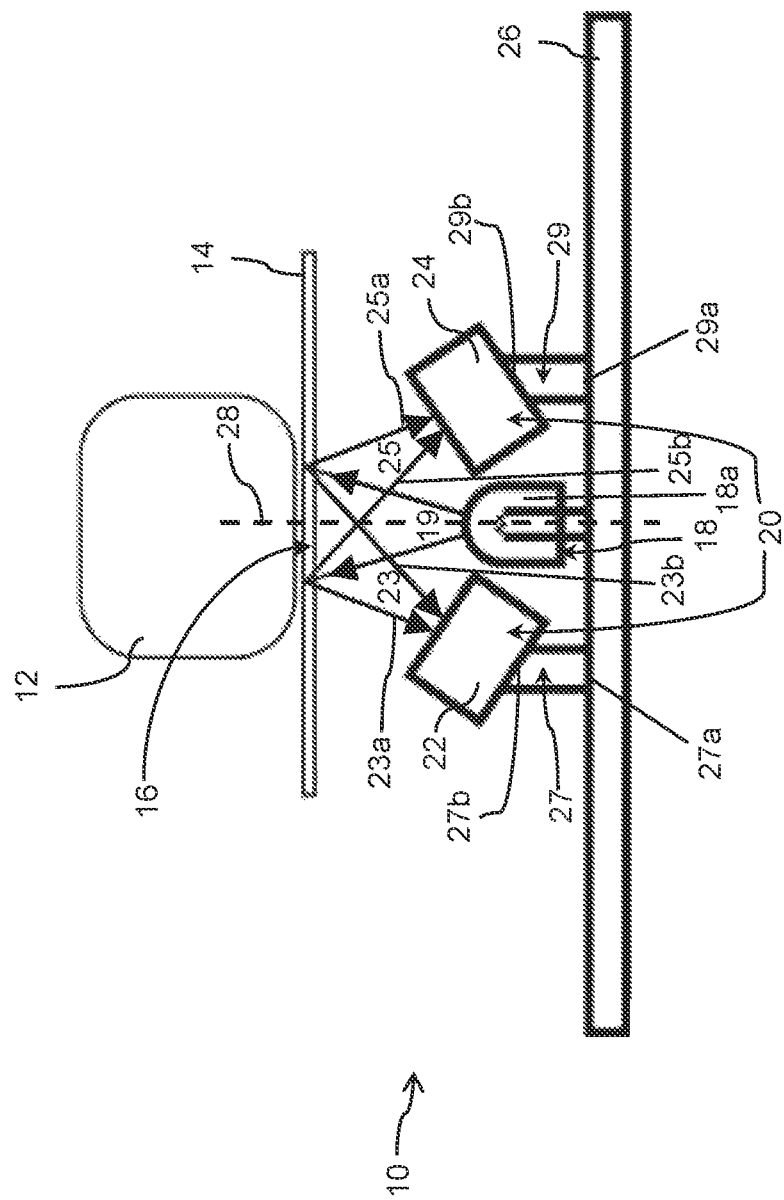
FIG. 1 is a side view illustrating a schematic representation of a spectroscopy device for analyzing a sample and having an illumination arrangement with at least one light source for illuminating a measurement area at which the sample is located and at least two spectral sensors focused on the measurement area, according to embodiments of the present invention.
Figure 2:
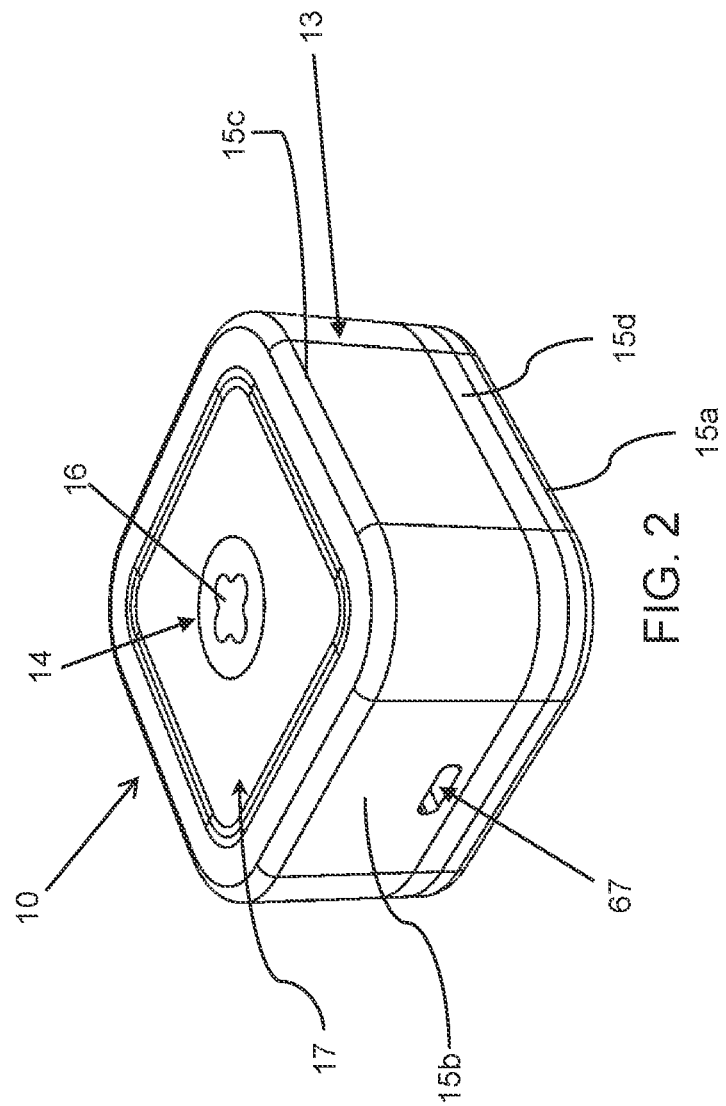
FIG. 2 is a perspective view illustrating a non-limiting example construction of the spectroscopy device of FIG. 1 according to an embodiment of the present invention.

Referring now to the drawings, FIG. 1 shows schematically a spectroscopy device, generally designated 10, according to an embodiment of the present invention, for analyzing a sample 12, and FIG. 2 shows an example construction of the spectroscopy device 10 according to a non-limiting embodiment of the present invention. The sample 12 to be analyzed by the spectroscopy device 10 is referred to interchangeably herein as a "measurement object". The sample 12 can be any sample of material, preferably organic material, including, but not limited to, various types of tissue (e.g., skin tissue), pharmaceuticals, food, agriculture products (e.g., meat, fruit, vegetables), oils, paints, sugars, soil, plastics, textiles, wood, petrochemicals, and the like. As will be discussed, the spectroscopy device 10 according to embodiments of the present invention may be used to advantage to perform composition-based analysis, including, but not limited to, skin analysis, tissue analysis, or any other organic materials analysis, paint color analysis, water pollution analysis, pigmentation analysis, material purity analysis, soil analysis, and food content analysis.

As will be discussed, the sample 12 emits light in response to incident illumination from an illumination source. In certain cases, the light emitted from the sample 12 can be light that is reflected from the sample in response to incident illumination from the illumination source, whereas in other cases the light emitted from the sample 12 can be by way of emission in response to excitation of electrons in the molecules of the sample 12 by incident illumination from the illumination source. The mechanism by which the light is emitted from the sample 12 can depend on the properties of the sample, in particular the molecular structure of the sample.

As illustrated in FIG. 1, the spectroscopy device 10 (referred to hereinafter interchangeably as "device" or "spectrometer" or "spectrometer device") includes an illumination arrangement 18 that includes at least one light source 18a for producing illumination 19 (represented schematically in FIG. 1 by illumination cone 19) for illuminating the sample 12 with incident illumination, and a spectral sensing arrangement 20 that includes at least a first spectral sensor 22 and a second spectral sensor 24 that are configured to collect illumination 23, 25 (represented schematically in FIG. 1 by beams of illumination 23 and 25 that include respective sample light rays 23a, 23b and 25a, 25b) arriving from a measurement area 16 at which the sample 12 is to be located and to produce spectral data from the collected illumination 23, 25. As will be discussed, the spectral sensors 22, 24 have a particular angulation (orientation) to enable collection of illumination from the same measurement area 16. The at least one light source 18a of the illumination arrangement 18 may also have an angulation to illuminate the measurement area (and thus the sample 12) with beams of incident illumination 19.

The measurement area 16 (also referred to as a "measurement spot" or an "illumination area") may be a generally planar region that can be a planar surface of any suitable shape and dimension including, but not limited to, circular, oblong, regular polygonal (e.g., triangular, square, rectangular, and the like), cross shaped, and the like. The measurement area 16 forms part of a preferably planar interface surface 14 that provides a contact or near contact surface between the device 10 and the sample 12. The measurement area 16 as well as the interface surface 14 may also form at least part of a cover member 17 (FIG. 2) of the device 10. In fact, in certain embodiments, such as the embodiment illustrated in FIG. 2, the area of the interface surface 14 occupies a proportion of the area of the cover member 17 (preferably a minority proportion, for example 10%-40% of the area of the cover member 17), and the measurement area 16 occupies a proportion of the area of the interface surface 14.

The illumination arrangement 18 is deployed so as to illuminate the measurement area 16 with the one or more beams of illumination such that the illumination is incident on the sample 12 when the sample 12 is located at the measurement area 16. In response to the incident illumination 19, the sample emits illumination 23, 25 (e.g., rays 23a, 23b and 25a, 25b) back toward the spectral sensing arrangement 20. In many cases, the sample 12 absorbs a proportion of the incident illumination 19 thus creating a spectrum of the illumination 23, 25 that can be measured by the spectral sensing arrangement 20. In certain cases, the illumination 23, 25 is the proportion of the illumination 19 that is reflected from the sample 12, whereas in other cases the illumination 23, 25 is emission by the sample 12 in response to excitation of electrons in the molecules of the sample 12 by the incident illumination 19.

Figure 6:
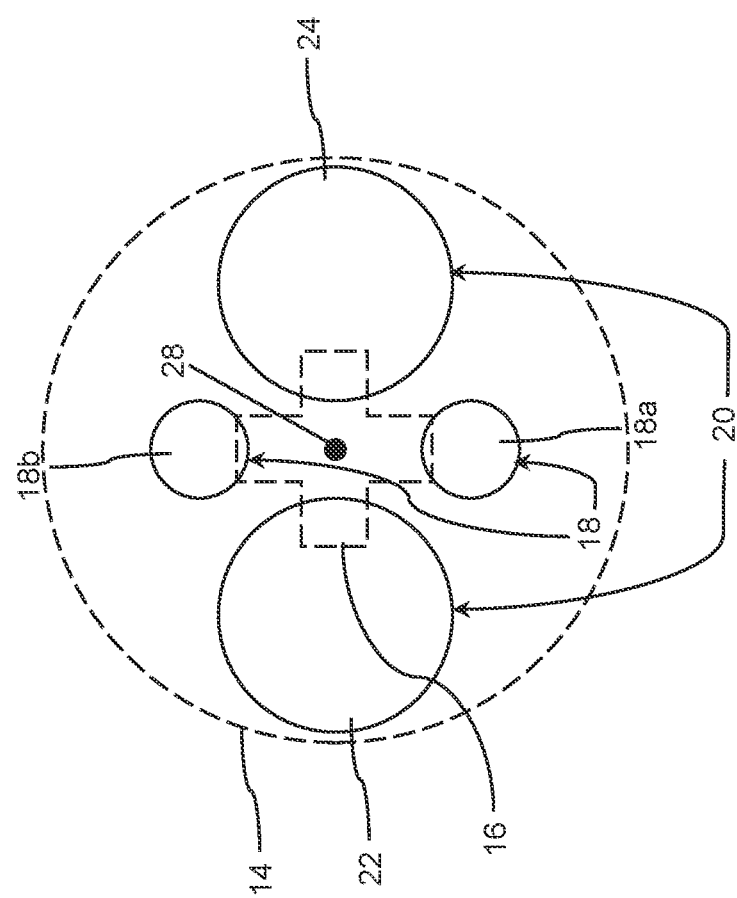
FIG. 6 is a top view illustrating a schematic representation of the deployment of two spectral sensors and an illumination arrangement having a pair of light sources, according to an embodiment of the present invention.

Although only one light source 18a is visible in FIG. 1, a second light source may be present but not visible in the view of FIG. 1. In certain preferred embodiments, the at least one light source 18a of the illumination arrangement 18 includes a pair of light sources that are symmetrically positioned relative to a plane that is perpendicular to a planar surface onto which the illumination arrangement 18 is mounted. FIG. 6 is a top view of the illumination arrangement 18 and the spectral sensing arrangement 20 in an embodiment in which a pair of light sources 18a, 18b are present. The angulation of the spectral sensors and the light sources is not visible in the view of FIG. 6. In such embodiments, the pair of light sources 18a, 18b and the pair of spectral sensors 22, 24 may be deployed in spaced relation about a central axis 28 that is perpendicular to the planar mounting surface and the interface surface 14, and that intersects the measurement area 16 approximately at the center of the measurement area 16. The light sources and the spectral sensors are preferably deployed about the axis 28 such that they are approximately equally radially spaced from the axis 28. In FIG. 6, the axis 28 is represented simply as a dot, and the interface surface 14 and the measurement area 16 (which is cross-shaped in the figure) are shown in phantom.

The at least one light source 18a, 18b of the illumination arrangement 18 may be implemented in various ways, including, for example, as one or more halogen lamps or other incandescent lamp, one or more light-emitting diodes (LEDs), or any other suitable light source for illuminating a sample of material with electromagnetic radiation. The light source of the illumination arrangement 18 may be implemented based on the type of spectral sensors 22, 24 used for collecting the spectral data. For example, the light source may be implemented as an ultraviolet (UV) light source, infrared (IR) light source, or a near infrared (NIR) light source. In one particularly preferred but non-limiting implementation, the illumination arrangement is a broad-spectrum (broadband) light source that is operative to produce illumination/radiation covering a wide range of wavelengths of the electromagnetic spectrum. It is noted, however, that the illumination arrangement is not limited to the examples provided above, and a person skilled in art may use any other suitable illumination arrangement that is suitable for spectral analysis of sample materials.

The measurement area 16 (as well as the interface surface 14) is preferably formed from a light-transmitting material, such as glass or any other suitable light-transmitting substrate, and is preferably transmissive to the wavelengths of the illumination produced by the illumination arrangement 18 such that the incident illumination 19 that reaches the sample 12 via transmission through the measurement area 16 includes light at all of the wavelengths of the light produced by the illumination arrangement 18. The measurement area 16 is also preferably suitably thin in the thickness dimension (which is the vertical dimension in FIG. 1), for example preferably no greater than 1 mm. Employing such a relatively thin measurement area reduces the distance over which the illumination 19 must travel before reaching the sample and likewise reduces the distance over which the return illumination 23 and 25 must travel before reaching the spectral sensors 22 and 24, respectively.

The illumination arrangement 18 and the spectral sensors 22, 24 may be mounted to a printed circuit board (PCB) 26 that sits below the interface surface 14 (and the cover member 17) such that the illumination arrangement 18 and the spectral sensors 22, 24 are interposed between the PCB 26 and the interface surface 14 (and the cover member 17).

As will be discussed, the spectral sensors 22, 24 are deployed such that each of the spectral sensors 22, 24 is oriented toward the measurement area 16 so as to collect illumination (i.e., electromagnetic radiation) that arrives from the same measurement area 16.

The device 10 is a compact device having a small form factor, and is preferably used as a user-operated hand-held device which can be operated by the user by positioning the device 10 in contact with or in proximity to the sample 12. Accordingly, in certain particularly preferred but non-limiting uses of the device 10, the sample 12 can be located at the measurement area 16 by positioning the device 10 relative to the sample 12 so as to bring the sample 12 into contact with, or close proximity to, the measurement area 16. Within the context of this document, the sample 12 is considered to be in close proximity to the measurement area 16 if the sample 12 is close enough to the measurement area 16 such that the illumination from the illumination arrangement 18 reaches the sample 12 such that the sample 12 emits illumination 23, 25 (either by reflection of the incident illumination 19 by the sample 12, or by emission in response to excitation of electrons in the molecules of the sample 12 by the incident illumination 19) with sufficient intensity to be detected by the spectral sensors 22, 24. In practice, "close proximity" is preferably at most a few millimeters, and more preferably no more than one millimeter (mm).

In other non-limiting uses, device 10 can be placed in a stable position on a surface (such as a tabletop), and the sample 12 can be located at the measurement area 16 by placing the sample 12 at the measurement area 16 on the interface surface 14, which in such a configuration acts as a support structure for supporting the sample 12 at the measurement area 16.

Each of the at least one light source of the illumination arrangement 18 has an illumination angular field. The illumination angular fields of the constituent light sources define the illumination angular field of the illumination arrangement 18. Preferably, the illumination arrangement 18 has an illumination angular field that is sufficiently large enough to illuminate the entire measurement area 16 such that the entire measurement area 16 falls within the illumination field. In fact, in certain configurations, the combined angular fields of the at least one light source of the illumination arrangement 18 may define the size of the measurement area 16. In FIG. 1, the extremes of the angular field of the at least one light source of illumination arrangement 18 are represented by the cone 19. It is noted that although FIG. 1 only shows the angular field of one of the light sources 18a, each light source of the illumination arrangement has a corresponding angular field of illumination that can be represented by a corresponding cone of illumination.

In one set of preferred but non-limiting implementations, the measurement area 16 is a generally circular region having a geometric area with a radius in a range between 5 mm to 70 mm.

Parenthetically, the measurement area 16 is preferably sized to accommodate all or most of the sample 12. It is noted that it may be preferable that the surface of the sample 12 that is associated with (i.e., in contact with or in close proximity to) the measurement area 16 is slightly larger than the measurement area 16, thereby ensuring that all or most of the beams of illumination from the illumination arrangement 18 are incident on at least part of the sample 12. In fact, in practice the illumination 19 is preferably incident on a larger region of the interface 14 than just the measurement area 16 thereby ensuring that the illumination 19 illuminates at least a portion of the surface of the sample 12 (where the illuminated portion is preferably an area having at least a 5 mm radius).

As mentioned, the device 10 is a compact device, and therefore the constituent electronic, optical, and electro-optical components of the device 10, including the PCB 26, the illumination arrangement 18, and the spectral sensors 22, 24, are preferably small-scale components which can be housed in compact form within a body member 13 (FIG. 2) of the device 10 enclosed by the cover member 17 (FIG. 2). In addition, in order to support the small form factor of the device 10, the spectral sensors 22, 24 and the illumination arrangement 18 are compactly deployed relative to each other and to the measurement area 16 such that the total footprint area of the electronic, optical, and electro-optical components of the device 10 is in a range between approximately 10 mm to 35 mm.

The spectral sensors 22, 24 can be implemented in various ways, including, but not limited to, mini-spectrometers (polychromators), spectrophotometers, spectral analyzers, spectrographs, Fourier transform infrared spectrometers (FTIRs), MEMS-FPI spectrum sensors for example a dual MEMS design having different wavelength ranges, NIR sensors/spectrometers such miniaturized NIR sensors, and Raman spectroscopy sensors. However, it is noted that the spectral sensors 22, 24 are not be limited to the example implementations provided above, and a person skilled in art may use any other spectrometer that is suitable for capturing the spectral information of a sample.

In certain preferred embodiments, the spectral sensors 22, 24 are sensitive to different respective wavelength ranges of light (radiation). This may provide higher fidelity spectral data and fidelity assessment of the composition of the sample when analyzing the spectral signature of the sample, as will be discussed in subsequent sections of the present disclosure. In certain embodiments, the range of wavelengths to which the first spectral sensor 22 is sensitive is non-overlapping with the range of wavelengths to which the second spectral sensor 24. In certain cases, limitations on the availability of the types of sensors that can be used to implement the spectral sensors 22, 24 may dictate that the two wavelength ranges are separated by 50 nanometers (nm) or more, for example approximately 100 nm. For example, limitations on availability of the sensors may dictate that the first spectral sensors 22 may be sensitive to light having wavelengths in the range of 1350 nanometers (nm) to 1650 nm, and the second spectral sensor 24 may be sensitive to light having wavelengths in the range of 1750 nm to 2150 nm. In other embodiments, the range of wavelengths to which the first spectral sensor 22 is sensitive is partially overlapping with the range of wavelengths to which the second spectral sensor 24. For example, the first spectral sensors 22 may be sensitive to light having wavelengths in the range of 1350 nm to 1650 nm, and the second spectral sensor 24 may be sensitive to light having wavelengths in the range of 1550 nm to 1850 nm. The spectral sensors can be chosen with appropriate overlap between the two wavelength ranges based on the type of sample that is to be analyzed.

The spectral sensors 22, 24 are configured to operate in different measurement modes of operation such that the two spectral sensors measure different respective quantities during the same measurement period. During the measurement period, the first spectral sensor 22 is configured to perform a spectral measurement of the sample 12 in response to the incident illumination 19 so as to produce spectral measurement data. The first spectral sensor 22 performs the spectral measurement by collecting illumination that is emitted from the sample 12 (arriving at the first spectral sensor 22 from the measurement area 16), and which includes the illumination 23 (which may be a proportion of the incident illumination 19 that is reflected by the sample 12). This process of performing the spectral measurement by the first spectral sensor 22 is also referred to herein as "collecting spectral data". During the same measurement period, the second spectral sensor 24 is configured to measure background noise so as to produce background measurement data that provides at least a partial correction for noise in the spectral measurement data. The second spectral sensor 24 performs the background measurement by collecting illumination that is emitted from the sample 12 (arriving at the second spectral sensor 24 from the measurement area 16), and which can include the illumination 25. This background noise, which manifests as noise in the spectral measurement data, can be, for example, due to non-uniformity in the measurements that arise from a change in the distance between the spectral sensors 22, 24 and the sample 12 during the spectral measurement period for example due to movement of the device 10 (due to, for example, minor movements of the hand holding the device 10), instability of the illumination arrangement 18 (e.g., fluctuations in intensity of the light) during the spectral measurement, temperature in the environment surrounding the sample 12 and the device 10 and/or fluctuations in such temperature, ambient or external light conditions (e.g., background illumination from other sources of light), and any other changes that may occur during the spectral measurement period that could introduce noise effects to spectral measurement.

The spectral measurement performed by the first spectral sensor 22 is performed across preferably the entire wavelength range to which the first spectral sensor 22 is sensitive so as to produce spectral measurement data containing spectral characteristic measurements (e.g., reflectance, absorptance) across the wavelength range. In embodiments in which the spectral sensors are implemented as MEMS type sensors, the first spectral sensor 22 can be configured to perform this spectral measurement for example by applying a wavelength dependent voltage sweep to the first spectral sensor 22 while the first spectral sensor 22 collects the illumination 23. The second spectral sensor 24 can be configured to perform the background measurement by configuring the second spectral sensor 24 at a specific (fixed) wavelength, for example by applying a constant voltage corresponding to the specific wavelength, while the second spectral sensor 24 collects illumination (including, for example, illumination 25).

As will be discussed, the spectral measurement data and the background measurement data are provided by the spectral sensing arrangement 20 to a processing subsystem associated with the spectral sensing arrangement 20 (for example by way of electrical and/or data communication), which is operative to receive the spectral measurement data and the background measurement data, and to apply a correction to the spectral measurement data, based on the background measurement data, so as to produce corrected spectral measurement data. The processing subsystem is not shown in FIG. 1, but details of the processing subsystem will be described in subsequent sections of the present disclosure with reference to FIG. 3. This "correction" that is applied to the spectral measurement data is an at least partial correction, in that the background measurement data may be used to fully correct for noise effects in the spectral measurement data or may only partially correct for such noise effects since there may be noise components or effects in the spectral measurement data for which the background measurement data cannot fully correct.

In certain preferred embodiments, the spectral sensors 22, 24 are operative to switch measurement modes to reverse the roles of the spectral sensors 22, 24 such that during a second measurement period (that is different from the measurement period discussed above, and preferably begins immediately after the end of the measurement period discussed above), the second spectral sensor 24 is configured to perform a spectral measurement of the sample 12 in response to the incident illumination 19 so as to produce second spectral measurement data. The second spectral sensor 24 performs the spectral measurement by collecting illumination that is emitted from the sample 12 (arriving at the second spectral sensor 24 from the measurement area 16), and which includes the illumination 25 (which may be a proportion of the incident illumination 19 that is reflected by the sample 12). This process of performing the spectral measurement by the second spectral sensor 22 is also referred to herein as "collecting spectral data". During the second measurement period, the first spectral sensor 22 is configured to measure background noise so as to produce second background measurement data that provides at least a partial correction for noise in the second spectral measurement data. The first spectral sensor 22 performs the background measurement by collecting illumination that is emitted from the sample 12 (arriving at the first spectral sensor 22 from the measurement area 16), and which can include the illumination 23. During the second measurement period, the second spectral sensor 24 may sweep across preferably the entire wavelength range to which the second spectral sensor 24 is sensitive (by, for example, applying a sweep across corresponding voltages in embodiments in which the spectral sensors are implemented as MEMS type sensors) while the second spectral sensor 24 collects the illumination 25, and the first spectral sensor 22 may be configured at a specific (fixed) wavelength (for example by applying a constant voltage corresponding to the specific wavelength) while the first spectral sensor 22 collects illumination (including, for example, illumination 23).

The processing subsystem that is associated with the spectral sensing arrangement 20 may then receive the second spectral measurement data and the second background measurement data, and apply a correction to the second spectral measurement data, based on the second background measurement data, so as to produce second corrected spectral measurement data. Similar to as discussed above, this "correction" that is applied to the second spectral measurement data is an at least partial correction.

It is a particular feature of embodiments of the present invention that the spectral sensors 22, 24, as well as the illumination arrangement 18, are deployed according to a particular geometric configuration such that the background measurement data collected by one of the spectral sensors can be used to successfully correct the spectral measurement data collected by the other of the spectral sensors. In general, in order to ensure that the background measurement data can be effectively used to correct the spectral measurement data, it is imperative that the two spectral sensors 22, 24 are deployed according to a geometric configuration in which they are oriented toward the same measurement area 16 so as to collect illumination that arrives from the same measurement area 16. In other words, each of the two spectral sensors 22, 24 is focused on the same measurement area 16 to receive illumination coming from the measurement area 16. By focusing the two spectral sensors 22, 24 on the same measurement area 16, one of the spectral sensors 24 or 22 is able to measure the noise (as the background measurement data) in the spectral measurement data collected by the other of the spectral sensors 22 or 24.

The particular geometric configuration and orientation of the spectral sensors 22, 24 can be achieved by angulating the spectral sensors 22, 24 toward the measurement area 16 such that the field of view (FOV) of each of the spectral sensors 22, 24 overlaps with the illumination field of the illumination arrangement 18 and such that the measurement area 16 falls within the FOVs of the spectral sensors 22, 24. This may also be achieved by deploying the spectral sensors 22, 24 such that they are symmetrically oriented about the axis 28 such that the measurement area 16 falls within the FOVs of the spectral sensors 22, 24. In embodiments in which the illumination arrangement 18 includes a pair of light sources, the spectral sensors 22, 24 are preferably deployed such that they are symmetrically oriented relative to the light sources of the illumination arrangement 18, for example as schematically illustrated in FIG. 6.

Parenthetically, the extreme of the FOV of the first spectral sensor 22 is represented by the sample rays 23a, 23b, but it is noted that a continuum of similar such light rays may span the FOV of the first spectral sensor 22. Similarly, the extreme of the FOV of the second spectral sensor 24 is represented by the sample rays 25a, 25b, but a continuum of similar such light rays may span the FOV of the second spectral sensor 24.

Preferably, the FOV of the spectral sensors 22, 24 have equal measure (i.e., the angle value of the FOV of the spectral sensors is approximately the same), and the FOV of the first spectral sensor 22 and the FOV of the second spectral sensor 24 are in overlapping relation with each other. Preferably, the spectral sensors 22, 24 are angled such that the central field vector of the field of view (FOV) of the each of the spectral sensors 22, 24 is oblique to the plane of the measurement area 16. In certain embodiments, the PCB 26 is planar and is parallel to the measurement area 16 and the interface surface 14, and the central field vector of the field of view (FOV) of the each of the spectral sensors 22, 24 is oblique to the interface surface 14, measurement area 16, and the PCB 26.

The FOV of each spectral sensor 22, 24 is defined by an optical arrangement (not shown) which can include an assembly of lenses, which may be refractive or reflective, or any combination thereof. The defined FOV for each spectral sensor corresponds to the region (i.e., the measurement area 16) from which the illumination will arrive, and thus ensures that the illumination from the sample 12 reaches a corresponding detector of each spectral sensor. The FOV of the spectral sensors is less than the angular field of the illumination arrangement 18. In one set of non-limiting implementations, the FOV of each of the spectral sensors is approximately 7°. However, other implementations of the spectral sensors may provide a different FOV, for example 5° or 6°.

In one particularly preferred but non-limiting implementation, the angulation of the spectral sensors 22, 24 relative to the measurement area 16 is achieved by mounting the spectral sensors 22, 24 to a support structure (which can be machined or otherwise manufactured from plastic or other non-electrically conductive material) having a suitably appropriate geometry that is attached to the PCB 26.

A non-limiting example of a support structure is schematically illustrated in FIG. 1 as support posts 27 and 29 attached to the PCB 26. The support posts 27 and 29 have respective bases 27a and 29a which connect the posts 27, 29 to the PCB 26, and have respective upper surfaces 27b and 29b to which the respective spectral sensors 22 and 24 are mounted. The upper surfaces 27b and 29b are angled relative to the plane of the measurement area 16 (and the interface surface 14), thereby providing the spectral sensors 22, 24 with the necessary angulation (orientation) to focus the spectral sensors on the same measurement area 16 to receive illumination coming from the measurement area 16.

Figure 3:
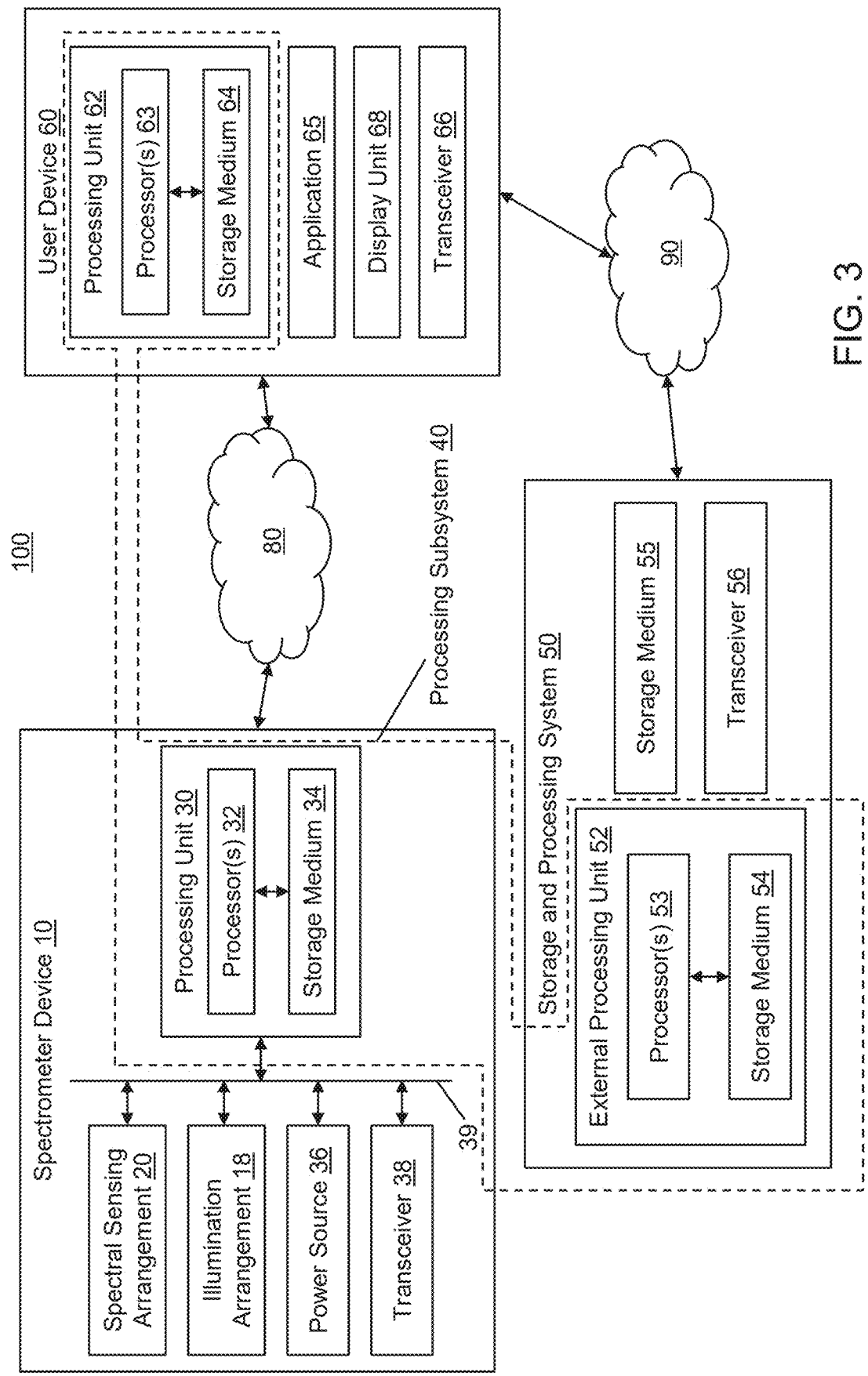
FIG. 3 is a block diagram of the spectroscopy device of FIG. 1 together with a remote server system and an application executed on a user device to form a system, according to embodiments of the present invention.

With continued reference to FIG. 1, refer now to FIG. 3 which shows a block diagram of the device 10 as part of a system 100 according to embodiments of the present invention. The system 100 includes the device 10 and a storage and processing system 50, for example a remote server system, that is separate from the device 10, and may also include an application 65 that is executable on a user device 60.

As illustrated, according to certain embodiments the device 10 includes a processing unit 30 having one or more processors 32 coupled to a storage medium 34 such as a memory or the like. The one or more processors 32 can be implemented as any number of computerized processors, including, but not limited to, microprocessors, microcontrollers, application-specific integrated circuits (ASICs), field programmable gate arrays (FPGAs), digital signal processors (DSPs), field-programmable logic arrays (FPLAs), and the like. In microprocessor implementations, the microprocessors can be, for example, conventional processors, such as those used in servers, computers, and other computerized devices. For example, the microprocessors may include x86 Processors from AMD and Intel, Xeon® and Pentium® processors from Intel, as well as any combinations thereof. The aforementioned computerized processors include, or may be in electronic communication with computer readable media, which stores program code or instruction sets that, when executed by the computerized processor, cause the computerized processor to perform actions. Types of computer readable media include, but are not limited to, electronic, optical, magnetic, or other storage or transmission devices capable of providing a computerized processor with computer readable instructions. It is noted that above-mentioned implementations of the one or more processors 32 represent a non-exhaustive list of example implementations.

The storage medium 34 can be any conventional storage media, which although shown as a single component for representative purposes, may be multiple components. The storage medium 34 can be implemented in various ways, including, for example, one or more volatile or non-volatile memory, a flash memory, a read-only memory, a random-access memory, and the like, or any combination thereof. In certain embodiments, the storage medium 34 can include at least one component configured to store machine executable instructions that can be executed by the one or more processors 32.

As should be apparent, all of the components of the processing unit 30 are connected or linked to each other (electronically) either directly or indirectly. The processing unit 30 may be mounted or otherwise electrically connected to the PCB 26.

The processing unit 30 and a processing unit 52, that is part of the storage and processing system 50, together form a processing subsystem 40. The processing subsystem 40 is configured to apply the correction to the spectral measurement data (produced by the first spectral sensor 22), based on the background measurement data (produced by the second spectral sensor 24), to produce the corrected spectral measurement data. To apply the correction to the spectral measurement data, the processing subsystem 40 may first, for example, correlate the spectral measurement data and the background measurement data to calculate noise in the spectral measurement data, and then subtract the calculated noise from the spectral measurement data values to produce the corrected spectral measurement data.

The processing subsystem 40 is also configured to apply the correction to the second spectral measurement data (produced by the second spectral sensor 24), based on the second background measurement data (produced by the first spectral sensor 22), to produce the second corrected spectral measurement data. Here too the processing subsystem 40 may first, for example, correlate the second spectral measurement data and the second background measurement data to calculate noise in the second spectral measurement data, and then subtract the calculated noise from the second spectral measurement data values to produce the second corrected spectral measurement data.

As discussed, the background noise measured by one of the spectral sensors 22 or 24 is indicative of noise or other measurement artifacts in the spectral measurement data obtained/produced by the other of the spectral sensors 24 or 22, and can be, for example, due to non-uniformity in the measurements that arise from a change in the distance between the spectral sensors 22, 24 and the sample 12 during the spectral measurement, instability of the illumination arrangement 18 (e.g., fluctuations in intensity of the light) during the spectral measurement, temperature in the environment surrounding the sample 12 and the device 10 and/or fluctuations in such temperature, ambient or external light conditions (e.g., background illumination from other sources of light), and any other changes that may occur during the spectral measurement period that could introduce measurement artifacts into the spectral measurements.

In certain embodiments, the processing unit 30 may perform the aforementioned correction. In other embodiments, the correction may be performed by the processing unit 52. In yet other embodiments, the processing unit 30 and the processing unit 52 may cooperate to perform processing of spectral measurement data in order to perform the aforementioned corrections.

The processing subsystem 40 may combine or fuse the two corrected spectral measurement data to produce resultant spectral data of the sample, which describes the spectral characteristics (for example reflectance or absorptance values) of the sample across the wavelengths to which the spectral sensors 22, 24 are sensitive.

According to certain embodiments, the processing subsystem 40, for example the processing unit 30, may be configured to control the illumination arrangement 18 to emit the one or more beams of illumination 19 toward the measurement area 16. For example, the processing subsystem 40 may actuate the illumination arrangement 18 to continuously emit the illumination 19 during an analysis period. The processing subsystem 40 may be further configured to control the spectral sensing arrangement 20 to switch operation of the spectral sensors 22, 24 between two measurement modes. For example, the processing subsystem 40 may actuate the spectral sensing arrangement 20 to operate in a first mode such that the first spectral sensor 22 performs a spectral measurement of the sample 12 (during a first measurement period of the analysis period) from collected illumination (e.g., 23) arriving from the sample in response to the incident illumination 19 so as to produce spectral measurement data, and such that the second spectral sensor 24 performs a background noise measurement (during the first measurement period) so as to produce background measurement data. The processing subsystem 40 may then reconfigure the spectral sensing arrangement 20 and actuate the spectral sensing arrangement 20 to operate in a second mode such that the second spectral sensor 24 performs a second spectral measurement of the sample 12 (during a second measurement period of the analysis period) from collected illumination (e.g., 25) arriving from the sample in response to the incident illumination 19 so as to produce second spectral measurement data, and such that the first spectral sensor 22 performs a background noise measurement (during the second measurement period) so as to produce second background measurement data.

With continued reference to FIG. 3, the device 10 may further include a power source 36 such as a battery that provides power to the electronic components of the device 10. In other embodiments, the device 10 may receive power from a mains power supply via a power cable. The device 10 may also include a transceiver 38 that provides at least part of a communication interface between the device 10 and the user device 60 and/or the storage and processing system 50, thereby enabling the device 10 to exchange data and information with the storage and processing system 50 and the user device 60 via one or more communication networks. The user device 60 can be any user computing device including, but not limited to, a smartphone, tablet, laptop computer, and desktop computer.

As should be apparent, all of the components of the device 10 are connected or linked to each other (electronically) either directly or indirectly, for example via a data connection such as a data bus 39.

The user device 60 includes a processing unit 62 having one or more processors 63 coupled to a storage medium 64 such as a memory or the like. In certain embodiments, the processing unit 62 forms part of the processing subsystem 40.

The one or more processors 63 can be implemented as any number of computerized processors, including, but not limited to, microprocessors, microcontrollers, application-specific integrated circuits (ASICs), field programmable gate arrays (FPGAs), digital signal processors (DSPs), field-programmable logic arrays (FPLAs), and the like. In microprocessor implementations, the microprocessors can be, for example, conventional processors, such as those used in servers, computers, and other computerized devices. For example, the microprocessors may include x86 Processors from AMD and Intel, Xeon® and Pentium® processors from Intel, as well as any combinations thereof. The aforementioned computerized processors include, or may be in electronic communication with computer readable media, which stores program code or instruction sets that, when executed by the computerized processor, cause the computerized processor to perform actions. Types of computer readable media include, but are not limited to, electronic, optical, magnetic, or other storage or transmission devices capable of providing a computerized processor with computer readable instructions.

The storage medium 64 can be any conventional storage media, which although shown as a single component for representative purposes, may be multiple components. The storage medium 64 can be implemented in various ways, including, for example, one or more volatile or non-volatile memory, a flash memory, a read-only memory, a random-access memory, and the like, or any combination thereof. In certain embodiments, the storage medium 64 can include at least one component configured to store machine executable instructions that can be executed by the one or more processors 63.

In certain embodiments, the device 10 communicates indirectly with the storage and processing system 50 via the user device 60. For example, the device 10 may send data and information, for example the spectral measurement data and the background measurement data, via the transceiver 38 to a transceiver 66 of the user device 60 over a first communication network 80. The transceiver 66 can include multiple transceivers that operate according to difference communication protocols, including Bluetooth protocols, WLAN protocols, cellular protocols, and the like. In certain non-limiting implementations, the first communication network is a wireless network, such as a Bluetooth connection. In such a Bluetooth connection implementation, the user device 60 and the device 10 communicate via a Bluetooth protocol, whereby the user device 60 can operate as a master device that controls the device 10 when configured as a slave device. In other non-limiting implementations, the first communication network is a wired data network provided, for example, by an input/output interface connected to a data wire or cable connection, for example a USB connection effectuated by a USB cable that can be connected to a USB port 67 (FIG. 2) of the device 10 and a corresponding port (not shown) of the user device 60.

The user device 60 may send data and information, for example the spectral measurement data and the background measurement data, via the transceiver 66 to a transceiver 56 of the storage and processing system 50 over a second communication network 90. The network 90 may be formed of one or more networks, including for example, the Internet, cellular networks, wide area, public, and local networks. The storage and processing system 50 may then process the received data (using the processing unit 52) to apply a correction to the spectral measurement data using (i.e., based on) the background measurement data. The storage and processing system 50 may then further process the corrected spectral measurement data, by, for example, performing an assessment analysis of the sample based on the corrected spectral measurement data and one or more prediction models. The assessment analysis may include qualitative analysis and/or quantitative analysis. For example, in certain embodiments, the assessment analysis includes determining quantitative composition details of the sample. Details of assessment analysis processing will be provided in subsequent sections of the present disclosure. The storage and processing system 50 may then send the processed data back to the user device 60 where it can be appropriately displayed to a user of the user device 60 via a display unit 68 of the user device 60.

In other embodiments, the processing unit 30 may process the spectral measurement data to apply a correction to the spectral measurement data using (i.e., based on) the background measurement data. The corrected spectral measurement data may be sent to the user device 60 (via the transceiver 38) which may then send the corrected spectral measurement data (via the transceiver 66) to the storage and processing system 50 for further processing by the processing unit 52, including, for example, performing the assessment analysis of the sample based on the corrected spectral measurement data and one or more prediction models.

In yet further embodiments, the corrected spectral measurement data may be sent directly from the device 10 to the storage and processing system 50.

The processing unit 52 includes one or more processors 53 coupled to a storage medium 55 such as a memory or the like. The one or more processors 53 can be implemented as any number of computerized processors, including, but not limited to, microprocessors, microcontrollers, application-specific integrated circuits (ASICs), field programmable gate arrays (FPGAs), digital signal processors (DSPs), field-programmable logic arrays (FPLAs), and the like. In microprocessor implementations, the microprocessors can be, for example, conventional processors, such as those used in servers, computers, and other computerized devices. For example, the microprocessors may include x86 Processors from AMD and Intel, Xeon® and Pentium® processors from Intel, as well as any combinations thereof. The aforementioned computerized processors include, or may be in electronic communication with computer readable media, which stores program code or instruction sets that, when executed by the computerized processor, cause the computerized processor to perform actions. Types of computer readable media include, but are not limited to, electronic, optical, magnetic, or other storage or transmission devices capable of providing a computerized processor with computer readable instructions.

The storage and processing system 50, in addition to the processing unit 52, may include a storage medium 54 such as a memory or the like. The storage mediums 55 and 54 can be any conventional storage media, which although shown as a single component for representative purposes, may be multiple components. The storage mediums 55 and 54 can be implemented in various ways, including, for example, one or more volatile or non-volatile memory, a flash memory, a read-only memory, a random-access memory, and the like, or any combination thereof. In certain embodiments, one or both of the storage mediums 55 and 54 can include at least one component configured to store machine executable instructions that can be executed by the one or more processors 53 of the processing unit 52.

As mentioned above, the corrected spectral measurement data may be further processed based on one or more prediction models in order to perform an assessment analysis of the sample (e.g., determine quantitative composition details of the sample). In particularly preferred but non-limiting embodiments, this processing is performed by the storage and processing system 50, for example using the remote processing unit 50. It is noted, however, that the processing may be performed locally at the device 10 by the processing unit 30, or may alternatively be performed by the processing unit 62 of the user device 60.

According to certain embodiments, the one or more prediction models used for assessment of the sample may include a classification model and a content measurement model. However, the one or more prediction models are not limited to sample classification and content measurement, and the prediction models may comprise any other prediction models that may use the corrected spectral measurement data to provide insights relating to the sample to a user of the device 10 and/or system 100.

The classification model may be used to classify the object (i.e., sample) in a particular category and/or sub-category. The categories may include, but are not limited to, tissue (e.g., skin tissue), pharmaceuticals, food, agriculture products (e.g., meat, crops, fruit, vegetables), oils, paints, sugars, soil, plastics, textiles, wood, and petrochemicals. Sub-categories may include, but are not limited to, particular types of pharmaceuticals (i.e., medicines), and particular types of crops. It is noted, however, that the categorization is not limited to above examples and a person skilled in the art may use any other categorization known to a person skilled in the art.

The content measurement model may be used to determine (predict) quantitative composition details of the sample by correlating the corrected spectral measurement data with data points in the trained content measurement model. The prediction of the quantitative composition details of the sample provides an improvement to the measurement accuracy of the content details of the sample, and enhances the measurement stability of the system 100.

For example, the corrected spectral measurement data can be correlated and/or compared with the spectral signatures of known materials characterized by the classification model in order to identify (i.e., categorize) the sample, and can be further correlated and/or compared with the spectral signatures of known materials characterized by the content measurement model in order to determine the quantitative composition details of the sample.

The processing subsystem 40 is preferably configured to provide the results of the spectral analysis, including the results of the assessment analysis, to the user device 60 for display on the display unit 68. Display of the results of the spectral analysis include at least displaying the corrected spectral measurement data, for example reflectance or absorptance or emission as a function of wavelength. The results of the assessment analysis may be graphical data and/or numerical data, whereby the display of the assessment analysis results may be a graphical visualization and/or a numerical representation. In certain embodiments, the results of the assessment analysis are displayed on the display unit 68 via an application 65 that is executed on the user device 60 for example by the processing unit 62.

The one or more prediction models may be trained based on a plurality of training data related to classification and content measurement of the sample. In one non-limiting embodiment, the one or more prediction models may be developed and trained in the user device 60 using the processing unit 62 of the user device 60. In such an embodiment, the training data and the prediction models may be stored in the storage medium 64 of the user device 60. In other embodiments, the processing unit 30 may be configured to build the one or more prediction models, and the training data and the one or more prediction models may be stored in the storage medium 34. In more preferred embodiments, the processing unit 52 may be configured to build the one or more prediction models, and the training data and the one or more prediction models may be stored in one or both of the storage mediums 54, 55.

Figure 4:
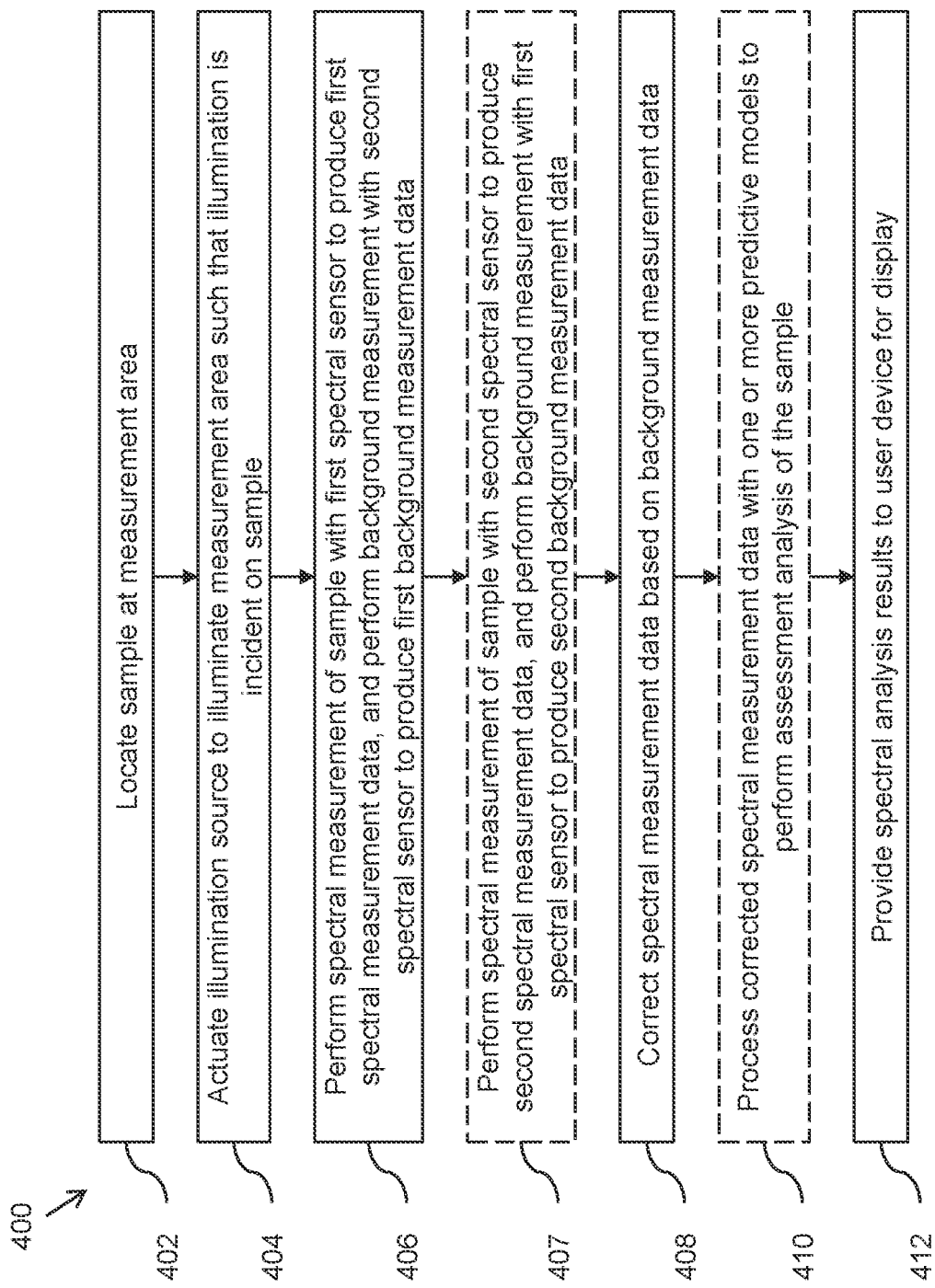
FIG. 4 is a flow diagram illustrating a process for analyzing a sample using the device of FIGS. 1 and 2 and/or the system of FIG. 3, according to an embodiment of the present invention.

Attention is now directed to FIG. 4 which shows a flow diagram detailing a process (method) 400 in accordance with embodiments of the disclosed subject matter. This process includes steps for analyzing a measurement object (sample). Reference is also made to the elements shown in FIGS. 1-3. The process and sub-processes of FIG. 4 are processes performed by the device 10 and/or the system 100.

The process 400 begins at step 402, where a sample that is to be analyzed is located at the measurement area 16. As discussed above, the sample can be located at the measurement area 16 by positioning the device 10 relative to the sample 12 so as to bring the sample 12 into contact with, or close proximity to, the measurement area 16.

At step 404, the illumination arrangement 18 is actuated (activated) to illuminate the measurement area 16 with one or more beams of illumination such that the illumination is incident on at least part of the sample. Preferably, the illumination arrangement continuously illuminates the measurement area 16 for the entirety of an analysis period.

At step 406, the spectral sensing arrangement 20 (configured in a first mode of operation during at least a first sub-period (i.e., first spectral measurement period) of the analysis period) performs spectral measurements. The first spectral sensor 22, which is focused on the measurement area 16 to receive illumination arriving from the measurement area 16, performs a first spectral measurement of the sample by collecting illumination (e.g., 23) emitted by the sample 12 in response to the incident illumination 19 so as to produce first spectral measurement data. The second spectral sensor 24, which is focused on the same measurement area 16 to receive illumination arriving from the measurement area 16, performs a first background measurement so as to produce first background measurement data. As discussed above, the second spectral sensor 24 performs the first background measurement by configuring the second spectral sensor 24 at a specific wavelength, for example by applying a constant voltage corresponding to the specific wavelength.

At optional step 407, the spectral sensing arrangement 20 is re-configured to operate in a second measurement mode during a second sub-period (i.e., second spectral measurement period) of the analysis period. In the second mode, the second spectral sensor 24 performs a second spectral measurement of the sample by collecting illumination (e.g., 25) emitted by the sample 12 in response to the incident illumination so as to produce second spectral measurement data, and the first spectral sensor 22 performs a second background measurement so as to produce second background measurement data. The re-configuration of the spectral sensing arrangement 20, i.e., the switching of the spectral sensing arrangement 20 between first mode of operation and the second mode of operation, is controlled by the processing subsystem 40, preferably by the processing unit 30.

At step 408, the processing subsystem 40 (for example the processing unit 30) applies a correction to the first spectral measurement data, based on the first background measurement data, to produce first corrected spectral measurement data. As part of step 408 the processing subsystem 40 may, for example, correlate the first spectral measurement data and the first background measurement data to calculate noise in the first spectral measurement data, and then subtract the calculated noise from the first spectral measurement data values to produce the first corrected spectral measurement data. Alternatively, the processing subsystem 40 may simply subtract the first background measurement data values from the first spectral measurement data values to produce the first corrected spectral measurement data. If step 407 is also performed, then as part of the step 408 the processing subsystem 40 (for example the processing unit 30) also applies a correction to the second spectral measurement data based on the second background measurement data to produce second corrected spectral measurement data. Here too the processing subsystem 40 may, for example, correlate the second spectral measurement data and the second background measurement data to calculate noise in the second spectral measurement data, and then subtract the calculated noise from the second spectral measurement data values to produce the second corrected spectral measurement data. Alternatively, the processing subsystem 40 may simply subtract the second background measurement data values from the second spectral measurement data values to produce the second corrected spectral measurement data.

In addition, as part of step 408, the processing subsystem 40 may combine or fuse together the first corrected spectral measurement data and the second corrected spectral measurement data to produce resultant spectral data of the sample.

Step 408 may be performed by the processing unit 52, in which case the first spectral measurement data and the first background measurement data are sent to the storage and processing system 50 (either directly from the device 10 or for example via the user device 60).

At optional step 410, the processing subsystem 40 (for example the processing unit 52) processes the first corrected spectral measurement data together with one or more prediction models to perform an assessment analysis of the sample. As discussed above, this may include determining quantitative composition details of the sample. If step 407 is also performed, then as part of step 410 the processing subsystem 40 also processes the second corrected spectral measurement data together with the one or more prediction models. The results of the assessment analysis, in particular the results of the prediction (determination) of the quantitative composition details of the sample, can be used by the processing subsystem 40 to update the predictive models.

At step 412, the processing subsystem 40 provides the results of the spectral analysis to the user device 60 for display via the display unit 68. The results of the spectral analysis include at least the first corrected spectral measurement data, but may also include the second corrected spectral measurement data if the process 400 performs step 407. In embodiments in which step 410 is performed, the results of the spectral analysis also include the results of the assessment analysis, which can include a prediction (determination) of the quantitative composition details of the sample. The results of the assessment analysis may also include a pass/fail determination based on predefined test targets.

As should be apparent to those of ordinary skill in the art, the steps of the process 400 may be executed in an order different from the order described above. For example, the process 400 may execute step 406 and then perform the correction step 408 for the first spectral measurement data and then perform the assessment analysis step 410 for the corrected first spectral measurement data. The process 400 may then execute step 407 and re-execute steps 408 and 410 for the second spectral measurement data. Furthermore, some of the steps of the process 400 may be broken into sub-steps, for example step 406 may be broken into a first sub-step in which the first spectral sensor 22 performs a spectral measurement of the sample and a second sub-step in which the second spectral sensor 24 performs a background measurement. Similarly, some of the steps of the process which have been described as separate steps may be executed as a single step.

In addition, it is noted that although step 407 is an optional step, it is preferable that step 407 and its related subsequent steps are also performed in order to increase the accuracy of the spectral analysis results of the process 400. This is due to the fact that many organic materials have spectral signatures that span across a wide band of wavelengths that may not be fully covered by any single one of the spectral sensors 22, 24. For example, the sample may have a spectral response (e.g., a non-negligible reflectance value) over the 1350 nm to 2150 nm wavelength range, but if only one of the spectral sensors 22 is used to collect spectral data (i.e., step 407 is not performed), and that spectral sensor 22 is sensitive to only a sub-band of the spectral response wavelengths (for example a spectral sensor that is sensitive to radiation in wavelengths in the range of 1350 nm to 1650 nm), then only a snapshot or limited segment of the spectral signature of the sample may be obtained by the process 400. Therefore, by collecting spectral measurement data with both spectral sensors 22, 24 (at different spectral measurement periods), a more accurate measurement of the spectral signature of the sample can be obtained (i.e., a measurement that covers a greater portion of the spectral band(s) at which the sample has a spectral response can be obtained). This also allows the processing subsystem 40 to perform a more accurate assessment analysis of the sample using the predictive models.

As mentioned, the results of the spectral analysis can be provided for display on the display unit 68 via an application 65 that is executed on the user device 60, for example by the processing unit 62. In certain embodiments, the application 65 may also be used to initiate the spectral analysis of the sample. For example, the application 65 may connect with the spectrometer device 10 through a communicative coupling between the user device 60 and the spectrometer device 10 (for example via USB connection). In response to user input to the application 65, the application 65 may then transmit one or more actuation signals, to begin the spectral analysis. The actuation signals may include an actuation signal that is transmitted to the illumination arrangement 18 to activate the illumination arrangement 18 so as to begin illuminating the measurement area 16 with one or more beams of illumination 19. The actuation signals may also include an actuation signal that is transmitted to the spectral sensing arrangement 20 to instruct the first spectral sensor 22 to perform a spectral measurement of the sample 12 and the second spectral sensor 24 to perform a background measurement, and then optionally instruct the second spectral sensor 24 to perform a spectral measurement of the sample 12 and the first spectral sensor 22 to perform a background measurement. The application 65 may further function to facilitate transmission of the resultant spectral measurement data and background measurement data to the relevant processing component(s) of the processing subsystem 40 for correction and assessment analysis, and further function to receive the results of the spectral analysis from the processing subsystem 40. When facilitating display of the results of assessment analysis, the application 65 may be configured to display the composition parameters of the sample, such as, for example, fat, carbohydrates, sugar, protein, and energy along with daily reference intake (DRI) for an average adult.

In other embodiments, the actuation of the illumination arrangement 18 to emit the one or more beams of illumination 19, and the actuation of the spectral sensing arrangement 20 to perform the spectral measurement(s) and background measurement(s), can be in response to an activation button on the device 10. For example, activation of such a button by a user of the device 10 may generate an input signal that is provided as input to the processing unit 30 of the device 10, and which instructs the processing unit 30 to actuate the illumination arrangement 18 and the spectral sensing arrangement 20.

Although the embodiments described thus far have pertained to a particular example of a spectral sensing arrangement having two spectral sensors, the embodiments of the present invention should not be limited to sensing arrangements having only two spectral sensors. For example, embodiments are contemplated in which a third (or more) spectral sensor is also deployed such that it is oriented toward the measurement area 16 so as to collect illumination that arrives from the measurement area 16. The third spectral sensor may be sensitive to light in a range of wavelengths outside of the wavelength sensitivity ranges of the other two spectral sensors 22, 24, or may be sensitive to light in a range of wavelengths that overlaps with one or both of the wavelength sensitivity ranges of the other two spectral sensors 22, 24. In configurations that employ more than two spectral sensors, pairs of the spectral sensors may operate to collect data during specific measurement period. For example, in a three-sensor configuration, the first and second spectral sensors may collect data during a first measurement period (where the first spectral sensor performs a spectral measurement of the sample and the second spectral sensor performs a background measurement), the second and third spectral sensors may collect data during a second measurement period (where the second spectral sensor performs a spectral measurement of the sample and the third spectral sensor performs a background measurement), and the third and first spectral sensors may collect data during a third measurement period (where the third spectral sensor performs a spectral measurement of the sample and the first spectral sensor performs a background measurement). As should be apparent, other pairings of the spectral sensors are possible. Furthermore, more than one of the spectral sensors can be used to perform the background measurement and the resultant background measurement data from the more than one spectral sensor can be combined and used to correct the spectral measurement data obtained by another of the spectral sensors. For example, the first spectral sensor may perform a spectral measurement of the sample to produce spectral measurement data, and the second and third spectral sensors may perform background measurements to produce sets of background measurement data that can be used by the processing subsystem to correct the spectral measurement data.

The addition of a third (or more) spectral sensor may further increase the accuracy with which the spectral signature of the sample can be obtained by the device and/or system, and may therefore also enable the processing subsystem to perform an even more accurate assessment analysis of the sample. It is noted, however, that in order to keep the device according to the embodiments of the present disclosure to a small form factor as a compact hand-held device, it is preferable that the internal electronic, optical, and electro-optical components of the device, including the PCB (and the electronic components connected thereto), the illumination arrangement, and the spectral sensors, occupy a small area (i.e., have a small footprint). Therefore, the footprint of the PCB onto which the spectral sensors are mounted may be a limiting factor for the number of spectral sensors that can be used. In addition, using configurations with only two spectral sensors according to the measurement scheme described above provides high-accuracy results, and at present the spectral sensors that can be used to implement the spectrometer device of the present invention are typically high-cost sensors. Therefore, it may be preferable to limit the spectral sensing arrangement to a configuration of two spectral sensors.

As alluded to above, the control and processing tasks performed by the processing subsystem 40 can be divided amongst the processing components of the processing subsystem 40 according to various subdivisions. Some examples of those subdivisions have been described above and particularly preferred examples of subdivisions will now be discussed here.

In one subdivision according to particularly preferred but non-limiting embodiment, the processing unit 52 processes the first spectral measurement data and the second spectral measurement data to produce corrected first spectral measurement data and second spectral measurement data, as described in step 408 of the process 400, and also processes the first corrected spectral measurement data and the second corrected spectral measurement data together with one or more prediction models to perform an assessment analysis of the sample, as described in step 410 of the process 400.

In another subdivision according to another non-limiting embodiment, the processing unit 30 of the device 10 processes the first spectral measurement data and the second spectral measurement data to produce corrected first spectral measurement data and second spectral measurement data, as described in step 408 of the process 400, and the processing unit 52 processes the first corrected spectral measurement data and the second corrected spectral measurement data together with one or more prediction models to perform an assessment analysis of the sample, as described in step 410 of the process 400.

Attention is now directed to FIG. 4 which shows a flow diagram detailing a process (method) 400 in accordance with embodiments of the disclosed subject matter. This process includes steps for analyzing a measurement object (sample). Reference is also made to the elements shown in FIGS. 1-3. The process and sub-processes of FIG. 4 are processes performed by the device 10 and/or the system 100.

Figure 5:
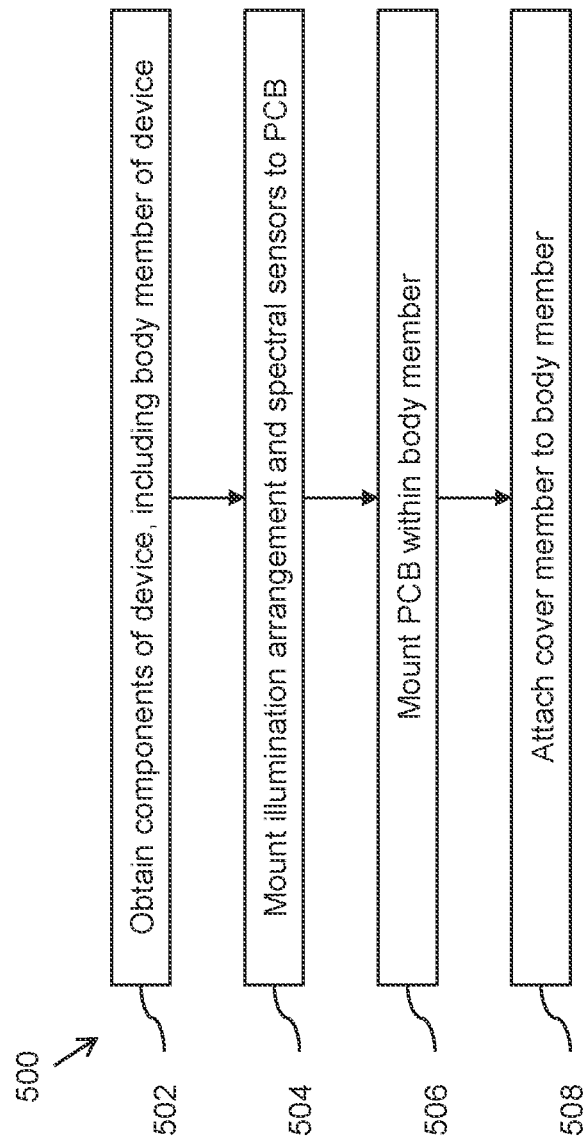
FIG. 5 is a flow diagram illustrating a process for manufacturing the device of FIGS. 1 and 2, according to an embodiment of the present invention.

Attention is now directed to FIG. 5 which shows a flow diagram detailing a process (method) 500 that includes steps for manufacturing (fabricating) the device 10 in accordance with certain non-limiting embodiments of the present invention. The process 500 also include steps for assembling the device 10. Reference is also made to the elements shown in FIGS. 1-3.

At step 502, components of the device 10, including a body member 13 (FIG. 2) of the device 10, are obtained. The body member 13 includes a bottom wall 15a and a sidewall 15b extending outwardly from the bottom wall 15a and continuously along the entire periphery of the bottom wall 15a. The bottom wall 15a and the sidewall 15b together define a cavity with an interior surface (not shown). The illumination arrangement 18, spectral sensors 22, 24, the PCB 26, and the support structure (e.g., support posts 27, 29) can also be obtained as part of step 502.

Parenthetically, the body member 13 has a band 15d extending around the lower portion of the sidewall 15b (just below the USB port 67), effectively providing a boundary region between the bottom wall 15a and the sidewall 15b. In certain embodiments, the bottom wall 15a and the sidewall 15b are constructed from aluminum, whereas the band 15d is constructed from plastic. This construction enables certain components of the transceiver 38, for example Bluetooth transceiver components, to communicate. However, constructions of the elements of the body member 13 according to other embodiments are contemplated herein, for example the bottom wall 15a, sidewall 15b, and band 15d may be constructed from a reinforced plastic material.

At step 504, the illumination arrangement 18 and the spectral sensors 22, 24 are mounted to the PCB 26. The spectral sensors 22, 24 can be mounted to the PCB 26 indirectly via the support structure (e.g., support posts 27, 29), which can be directly mounted to the PCB 26 such that the at least one light source of the illumination arrangement 18 is interposed between the support posts 27, 29 in a lateral dimension (for example in the horizontal dimension in FIG. 6). The spectral sensors 22 and 24 are mounted to the support structure (respective support posts 27 and 29) such that the spectral sensors 22, 24 achieve the necessary angulation (orientation) so as to be focused on the same measurement area. Preferably, the spectral sensors 22, 24 are mounted to the support structure either prior to the support structure being mounted to the PCB 26 so as to enable electrical connection between the PCB 26 and the spectral sensors 22, 24. Electrical connection between the PCB 26 and the illumination arrangement 18 and the spectral sensors 22, 24 can also be made as part of step 504. Parenthetically, each of the support posts 27, 29 preferably includes at least one hollow through section, that extends between the upper surface 27b, 29b and the base 27a, 29a, through which the respective spectral sensor 22, 24 can be connected to the PCB 26. For example, one or more electrical connection components, such as one or more wires or pins that connect at one end to the spectral sensors 22, 24 and at the other end to the PCB 26, can be threaded through the hollow through sections so as to provide electrical connection between the spectral sensors 22, 24 and the PCB 26.

At step 506, the PCB 26 (with the illumination arrangement 18, support posts 27, 29 and spectral sensors 22, 24 mounted thereto) can then be mounted within the cavity of the body member 13, at the interior surface of the cavity.

At step 508, the cover member 17 (which is formed in part by the interface surface 14 and the measurement area 16) can be attached to the body member 13, for example at the sidewall 15b (for example at an upper rim 15c of the sidewall 15b), so as to encase the PCB 26, the illumination arrangement 18, and the spectral sensors 22, 24 within the body member 13 of the device 10.

Parenthetically, it is noted that as part of step 504 the illumination arrangement 18 can be mounted to the PCB 26 indirectly via a support structure, similar to the support structure to which the spectral sensors 22, 24 are mounted. The support structure to which the illumination arrangement 18 is mounted can provide the at least one light source 18a of the illumination arrangement 18 with the appropriate angulation to illuminate the measurement area (and thus the sample 12) with beams of incident illumination 19. Furthermore, in certain embodiments the support structures for the spectral sensing arrangement 20 and the illumination arrangement 18 can be part of a single member that is to be mounted to the PCB 26. For example, the single member can be a single support member that is machined/manufactured as a single piece having support structures for the spectral sensors 22, 24 and support structures for the light sources of the illumination arrangement 18.

As previously discussed, in certain embodiments the upper surfaces 27b, 29b of the support posts 27, 29 are angled relative to the plane of the measurement area 16 (and the interface surface 14), thereby providing the spectral sensors 22, 24 with the necessary angulation (orientation) to focus the spectral sensors on the same measurement area 16 to receive illumination coming from the measurement area 16. In certain non-limiting embodiments, the support structure (e.g., the support posts 27, 29) can be designed and machined/manufactured in order to produce an inclination angle of the upper surfaces 27b, 29b that achieves the necessary angulation (orientation) of the spectral sensors 22, 24. The machining/manufacturing of the support structure can be performed as part of obtaining the support structure according to step 502. The inclination angle of the upper surfaces 27b, 29b can be determined based on the system specifications and/or performance requirements of the device 10, including, but not limited to, the design specifications of the spectral sensors 22, 24 such as, for example, the FOV of the spectral sensors 22, 24, and the size and the geometry of the device 10 and its sub-components, such as, for example, the size of the measurement area 16, the distance between the measurement area 16 and the spectral sensors 22, 24, and the distance between the measurement area 16 and the illumination arrangement 18.

The support structure can be machined using any suitable technique, including for example molding techniques, such as injection molding, whereby a suitable mold of the support structure is produced, for example using a computer-aided design tool, in accordance with the structural design requirements (i.e., angulation/orientation) discussed above, and the produced mold is used to produce the support structure. In another non-limiting example, the support structure can be manufactured by three-dimensional (3D) printing.

As discussed in detail above, by employing a geometry of the spectral sensing arrangement 20 that focuses the spectral sensors on the same measurement spot, one of the spectral sensors is able to perform a background measurement to produce background measurement data that provides at least a partial correction for noise in the spectral measurement data produced from spectral measurement performed by another one of the spectral sensors. It is noted, however, that the geometry of the spectral sensing arrangement 20 provides other advantages besides noise correction, for example reduced vulnerability to inhomogeneity in the sample 12. In particular, since the spectral sensors of the spectral sensing arrangement 20 are focused on the same measurement area 16, any inhomogeneity in the sample 12 (for example inhomogeneities that are present in certain types of crops, certain types of powders, etc.) will not affect the outcome of the spectral analysis and/or assessment analysis. In fact, this advantage is also present in embodiments in which no background measurement (i.e., noise correction) is performed. Thus, according to certain embodiments, the first spectral sensor 22 and the second spectral sensor 24 can be configured to operate in the same measurement mode of operation simultaneously during the same measurement period, whereby during the same measurement period the first spectral sensor 22 is configured to perform a spectral measurement of the sample 12 in response to the incident illumination 19 so as to produce first spectral measurement data and the second spectral sensor 24 is configured to perform a spectral measurement of the sample 12 in response to the incident illumination 19 so as to produce second spectral measurement data. The first and second spectral measurement data can be further processed, for example using assessment analysis, and the result of the spectral analysis and/or assessment analysis can be provided to the user device 60, as described above.

Implementation of the system and/or device of embodiments of the invention can involve performing or completing selected tasks manually, automatically, or a combination thereof. Moreover, according to actual instrumentation and equipment of embodiments of the system and/or device of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of the method and/or device and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. A non-transitory computer readable (storage) medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The flowcharts and block diagrams in the accompanying drawings illustrate the architecture, functionality, and operation of possible implementations of devices, systems, and methods according to various embodiments of the present invention. In this regard, some of the blocks in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Portions of the above-described processes can be performed by software, hardware, and combinations thereof. These portions can be performed by computers, computer-type devices, workstations, processors, micro-processors, other electronic searching tools and memory and other non-transitory storage-type devices associated therewith. The portions can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods), devices, and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods), devices, and systems have been described in a manner sufficient to enable persons of ordinary skill in the art to readily adapt other hardware and software as may be needed to reduce any of the embodiments to practice without undue experimentation and using conventional techniques.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form, "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

Although the invention has been described in conjunction with specific embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A device for analyzing a sample comprising:
    a measurement area at which the sample is to be located;
    an illumination arrangement including at least one illumination source for illuminating the measurement area with illumination such that the illumination is incident on the sample; and
    a spectral sensing arrangement including:
        a first spectral sensor configured to perform a spectral measurement of the sample during a measurement period in response to the incident illumination so as to produce spectral measurement data, and a
        second spectral sensor configured to measure background noise that arises from changing measurement conditions during the measurement period so as to produce background measurement data that provides at least a partial correction for noise in the spectral measurement data,
    wherein the spectral sensing arrangement is deployed such that each of the first and second spectral sensors is oriented toward the measurement area so as to collect illumination arriving from the measurement area;
    wherein the first spectral sensor is configured to perform the spectral measurement of the sample during the measurement period by applying a wavelength-dependent voltage sweep while collecting the illumination arriving from the measurement area, and where in the second spectral sensor is configured to measure the background noise that arises from changing measurement conditions during the measurement period during the measurement period by applying a constant voltage corresponding to a specific wavelength while collecting the illumination arriving from the measurement area.

2. The device of claim 1, further comprising: a processing unit associated with the spectral sensing arrangement and configured to apply a correction to the spectral measurement data, based on the background measurement data, to produce corrected spectral measurement data.

3. The device of claim 1, further comprising: a processing unit associated with the spectral sensing arrangement and configured to:
    switch operation of the spectral sensing arrangement such that: the second spectral sensor performs a second spectral measurement of the sample in response to the incident illumination so as to produce second spectral measurement data, and the first spectral sensor measures background noise so as to produce second background measurement data that provides at least a partial correction for noise in the second spectral measurement data.

4. The device of claim 3, wherein the processing unit is further configured to apply a correction to the second spectral measurement, based on the second background measurement, to produce second corrected spectral measurement data.

5. The device of claim 1, wherein the first spectral sensor is sensitive to illumination in a first range of wavelengths, and wherein the second spectral sensor is sensitive to illumination in a second range of wavelength.

6. The device of claim 5, wherein the first range of wavelengths is non-overlapping with the second range of wavelengths.

7. The device of claim 5, wherein the first range of wavelengths is partially overlapping with the second range of wavelengths.

8. The device of claim 1, wherein the first spectral sensor has an associated first field of view (FOV) and the second spectral sensor has an associated second FOV, wherein a measure of the FOV of the first spectral sensor is approximately equal to a measure of the FOV of the second spectral sensor, wherein the first FOV and second FOV are in overlapping relation with each other, and wherein the first and second spectral sensors are oriented such that the measurement area falls within the first FOV and the second FOV.

9. The device of claim 8, wherein the illumination arrangement has an associated illumination field and is oriented such that the measurement area falls within the illumination field and such that the illumination field is in overlapping relation with the first FOV and the second FOV, and wherein each of the first FOV and the second FOV is less than the illumination field.

10. The device of claim 1, wherein the first spectral sensor has an associated first field of view (FOV) and the second spectral sensor has an associated second FOV that is approximately equal to the first FOV, and wherein the first and second spectral sensors are symmetrically oriented about an axis that is substantially perpendicular to the measurement area such that the measurement area falls within the first FOV and the second FOV.

11. The device of claim 1, wherein the measurement area forms at least part of a cover member of the device.

12. The device of claim 1, wherein the measurement area is transmissive to the illumination from the illumination arrangement.

13. A system for analyzing a sample comprising:
   the device of claim 1; and
   a processing subsystem associated with the spectral sensing arrangement configured to apply a correction to the spectral measurement data, based on the background measurement data, to produce corrected spectral measurement data.

14. The system of claim 13, wherein the processing subsystem is further configured to:
   switch operation of the spectral sensing arrangement such that: the second spectral sensor performs a second spectral measurement of the sample in response to the incident illumination so as to produce second spectral measurement data, and
   the first spectral sensor measures background noise so as to produce second background measurement data, and
   apply a correction to the second spectral measurement based on the second background measurement.

15. The system of claim 13, wherein the processing subsystem is further configured to perform an assessment analysis of the sample based on the corrected spectral measurement data and one or more prediction models.

16. The system of claim 13, wherein the processing subsystem includes at least one processing component that is deployed as part of a storage and processing system that is separate from the device.

17. A method for analyzing a sample comprising:
   deploying a first spectral sensor and a second spectral sensor such that each of the first and second spectral sensors is oriented toward a measurement area at which the sample is located so as to collect illumination arriving from the measurement area;
   illuminating the measurement area with illumination such that the illumination is incident on the sample;
   by the first spectral sensor, performing a spectral measurement of the sample during a measurement period in response to the incident illumination so as to produce spectral measurement data; and
   by the second spectral sensor, measuring background noise that arises from changing measurement conditions during the measurement period during the measurement period so as to produce background measurement data that provides at least a partial correction for noise in the spectral measurement data;
   wherein the first spectral sensor is configured to perform the spectral measurement of the sample during the measurement period by applying a wavelength-dependent voltage sweep while collecting the illumination arriving from the measurement area, and where in the second spectral sensor is configured to measure the background noise that arises from changing measurement conditions during the measurement period during the measurement period by applying a constant voltage corresponding to a specific wavelength while collecting the illumination arriving from the measurement area.

18. The method of claim 17, further comprising:
   applying a correction to the spectral measurement data, based on the background measurement data, to produce corrected spectral measurement data.

19. The method of claim 17, further comprising:
   by the second spectral sensor, performing a second spectral measurement of the sample in response to the incident illumination so as to produce second spectral measurement data; and
   by the first spectral sensor, measuring background noise so as to produce second background measurement data that provides at least a partial correction for noise in the second spectral measurement data.

20. The method of claim 19, further comprising:
   applying a correction to the second spectral measurement data, based on the second background measurement data, to produce second corrected spectral measurement data.

21. The method of claim 17, wherein performing the spectral measurement by the first spectral sensor includes measuring reflectance over a range of wavelength.

22. The method of claim 17, further comprising: performing an assessment analysis of the sample based on the corrected spectral measurement data and one or more prediction models.

23. A hand-held device for analyzing a sample, the hand-held device comprising:
   a cover member having a measurement area at which the sample is to be located;
   a body member that houses a plurality of components in compact form, the cover member for enclosing the plurality of components housed in the body member, the plurality of components including:
      a printed circuit board (PCB);
      a support arrangement attached to the PCB;
      an illumination arrangement mounted to the support arrangement and including at least one illumination source for illuminating the measurement area with illumination such that the illumination is incident on the sample, and
      a spectral sensing arrangement including:
         a first spectral sensor mounted to a first part of the support arrangement and configured to perform a spectral measurement of the sample in response to the incident illumination so as to produce spectral measurement data, and
         a second spectral sensor mounted to a second part of the support arrangement and configured to measure background noise so as to produce background measurement data that provides at least a partial correction for noise in the spectral measurement data,
      wherein the illumination arrangement and the spectral sensing arrangement are mounted to the PCB via the support arrangement such that the illumination arrangement and the spectral sensing arrangement are interposed between the PCB and the measurement area, wherein the first and second parts of the support arrangement are angulated such that each of the first and second spectral sensors is oriented toward the measurement area so as to collect illumination arriving from the measurement area; and wherein the first spectral sensor is configured to perform the spectral measurement of the sample during a measurement period by applying a wavelength-dependent voltage sweep while collecting the illumination arriving from the measurement area, and wherein the second spectral sensor is configured to measure the background noise that arises from changing measurement conditions during the measurement period during the measurement period by applying a constant voltage corresponding to a specific wavelength while collecting the illumination arriving from the measurement area.

* * * * *